Figure 1:
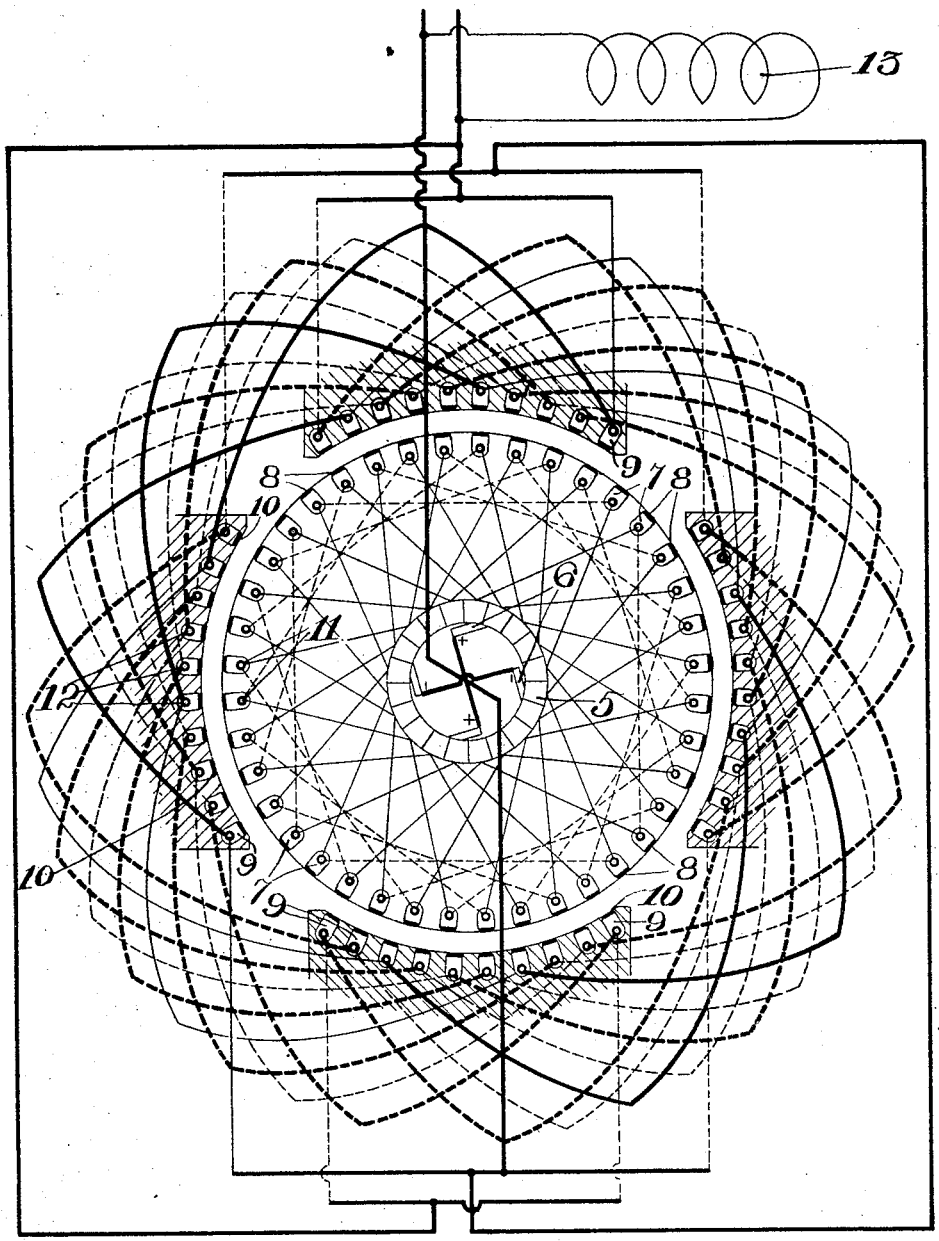

D. C. JACKSON.
DYNAMO MACHINE.
APPLICATION FILED MAY 16, 1904.

960,093.

Patented May 31, 1910.
4 SHEETS—SHEET 1.

Witnesses:

Inventor:
Dugald C. Jackson.
By Charles A. Brown
Attorneys.

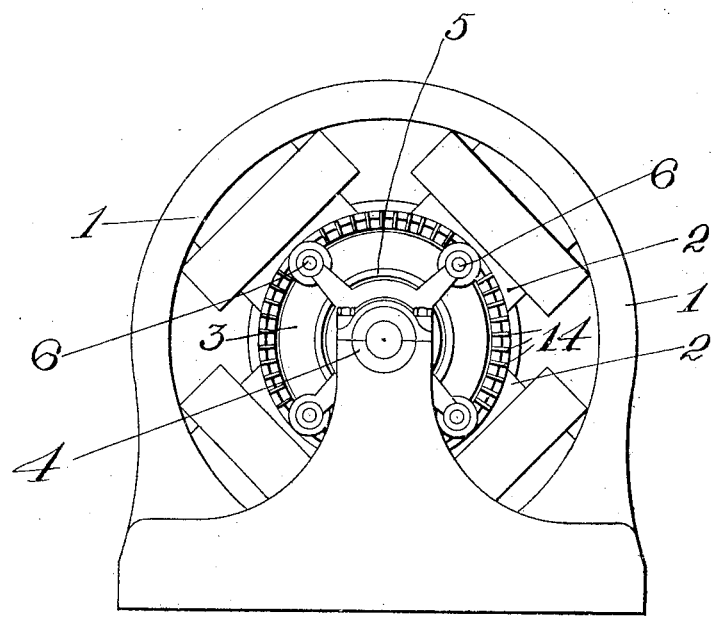
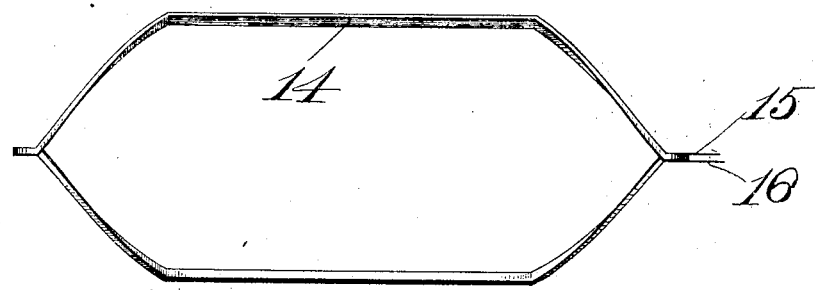

D. C. JACKSON.
DYNAMO MACHINE.
APPLICATION FILED MAY 16, 1904.

960,093.

Patented May 31, 1910.
4 SHEETS—SHEET 3.

Witnesses
George E. Higham.
Robert F. Bracke.

Inventor
Dugald C. Jackson
By Brown Williams
Attorneys

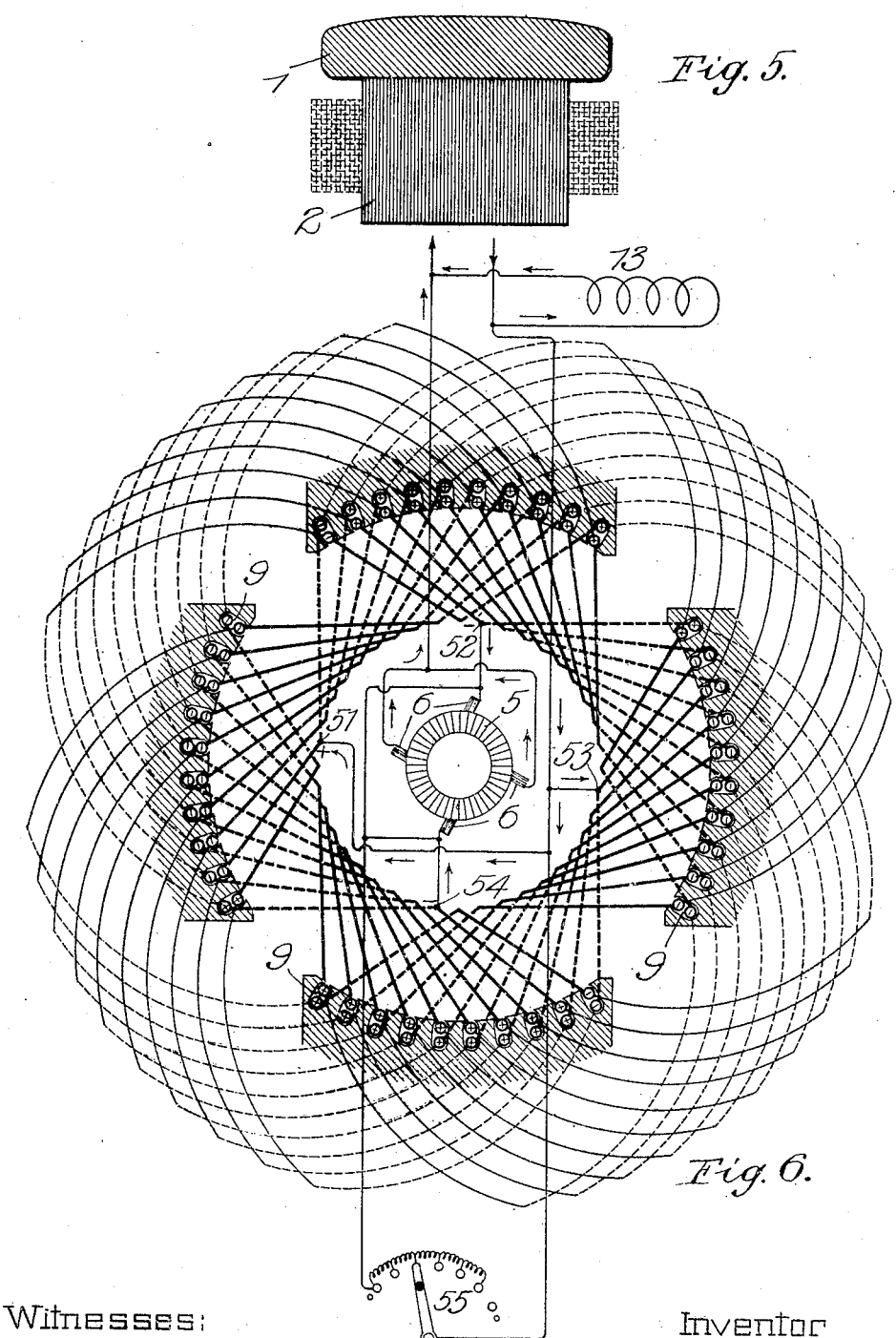

UNITED STATES PATENT OFFICE.

DUGALD C. JACKSON, OF MADISON, WISCONSIN.

DYNAMO-MACHINE.

960,093.  Specification of Letters Patent.  Patented May 31, 1910.

Application filed May 16, 1904. Serial No. 208,064.

*To all whom it may concern:*

Be it known that I, DUGALD C. JACKSON, citizen of the United States, residing at Madison, in the county of Dane and State of Wisconsin, have invented a certain new and useful Improvement in Dynamo-Machines, of which the following is a full, clear, concise, and exact description, reference being had to the accompanying drawings, forming a part of this specification.

My invention relates to dynamo machines, and has for its object the provision of means whereby sparking at the brushes may be avoided without resorting to the usual alternative of shifting the brushes.

More particularly, my invention relates to the excitation of the field magnets of dynamo machines having commutators, in such a way that the lines of magnetic force will thread through the armature in a constant fixed direction without regard to variations of current in the armature coils, or to the direction of rotation of the armature. By thus maintaining a constant direction and strength of the magnetic field, it is unnecessary to shift the position of the brushes under varying conditions of current, pressure or speed, and while the brushes remain in but one position, sparking at the commutator is almost entirely avoided.

In order to prevent sparking in a dynamo or motor, it is necessary to maintain a practically constant angle between the diameter of commutation and the direction of the lines of force threading through the armature. If when no current is flowing through the armature of a dynamo or motor, the field magnets of the same are excited in the customary manner, lines of force will flow between the pole pieces in a certain given direction. If now an electric circuit be closed through the rotating armature, electric currents will flow in the armature conductors, which currents in turn will cause lines of magnetic force to be set up about each conductor and through the armature core. Some of these armature conductors will have such a position that the lines of force which they set up will flow in a direction more or less at right angles to the lines of force set up by the field magnets. These conductors are known as cross turns. On account of the magnetization set up by these cross turns, there is a resultant field which combines the lines of force set up by the cross turns, with those set up by the field pole pieces. This resultant field has a direction different from that normally set up by the field winding alone when the armature is idle. As the strength of the current in the armature increases, the component of the resulting field, due to the armature cross turns, will be correspondingly increased. As the number of these lines of force flowing at right angles to the normal field is thus increased, the angle between the direction of the normal magnetic field and the direction of the resultant magnetic field, will be correspondingly increased. It is apparent that as the direction and strength of the resultant field through the armature varies, due to variations of current in the armature cross turns, the direction of the diameter of commutation must also be changed. This changing of the position of the brushes, due to a varying current in the armature, is an objectionable feature in the regulation of dynamos and motors, because it requires the constant attention of an attendant, as this regulation is usually accomplished by hand. Automatic means which have been provided for changing the position of the brushes, are faulty on account of their complication and multiplicity of working parts.

It has therefore been proposed magnetically to neutralize the effect of the armature cross turns, by associating with each armature conductor a parallel conductor stationarily mounted outside but near to the periphery of the armature, in which neutralizing conductor electric currents are caused to flow in opposite directions to the currents in the armature conductors. By this means it will be seen that for each conductor in the armature carrying a current and therefore setting up a magnetic field, there is a second conductor parallel and near to this conductor which also sets up a magnetic field; and as the currents in these two conductors are caused to flow in opposite directions, the magnetic effects due to each will be almost entirely neutralized by the magnetic effects set up by the other. This compensation for cross turns may be made such as almost exactly and entirely to counteract the effects due to the armature cross turns; or in some cases it may be found desirable to over-compensate or to under-compensate for the armature cross turns, by making the current flowing through the compensation winding greater or less than the current flowing in the armature. The proposed embodiments of this idea have contemplated an iron field magnet made in the form of a ring which entirely surrounds the armature, and about which or through which the neutralizing or compensating conductors are wound as on a Gramme ring armature. My invention contemplates a greatly simplified construction, and one far less expensive in construction.

My invention contemplates an improved method of winding compensating windings or conductors, whereby every armature conductor will be paralleled by a compensating conductor. This compensating winding may thus be made electrically identical with the armature winding, except that the currents flow in one direction in an armature conductor, and in the opposite direction in the adjacent compensating conductor. In order to accomplish this nearly perfect compensation at a small cost and at the same time to retain the present efficient form of field magnets, I preferably divide the total number of compensating conductors into as many groups as there are pole pieces; thus, if there be four pole pieces in the field magnet of the dynamo, I divide the total number of compensating conductors, which may be equal to the total number of armature conductors, into four equal parts. I further find it desirable to cut slots through the pole faces, similar to the slots now commonly cut in armature cores, and wind the compensating windings through these slots. Thus, if there be forty slots cut in the periphery of the armature core, I find it desirable to cut ten slots in each pole face and to wind one coil of one conductor (corresponding to the winding through one slot in the armature) through one slot of the pole face. The slots cut in the pole faces may be equally spaced, which will give a compensating magnetization which will almost exactly neutralize the magnetization due to the armature turns. If a more nearly perfect compensation is desirable, this may readily be accomplished by decreasing the spaces between the slots near the pole tips, and correspondingly increasing the spaces between the slots near the middle portions of the pole faces.

It is a well-known practice among those skilled in the art to wind armature coils on formers, and then to place them in the slots after the coils and slots have been duly insulated. In this manner it is possible carefully and thoroughly to insulate each armature coil, and further to insulate the slots into which the armature windings are to be placed. Since the coils are all alike, it makes their construction much less expensive than would be the case if each armature coil had to be wound in place by hand. It is characteristic of the construction of my present invention that all the compensation coils may be alike, and that they may therefore be wound upon formers and applied to the slots when the machine is assembled.

My invention will be understood by reference to the accompanying drawings in which—

Figure 3:
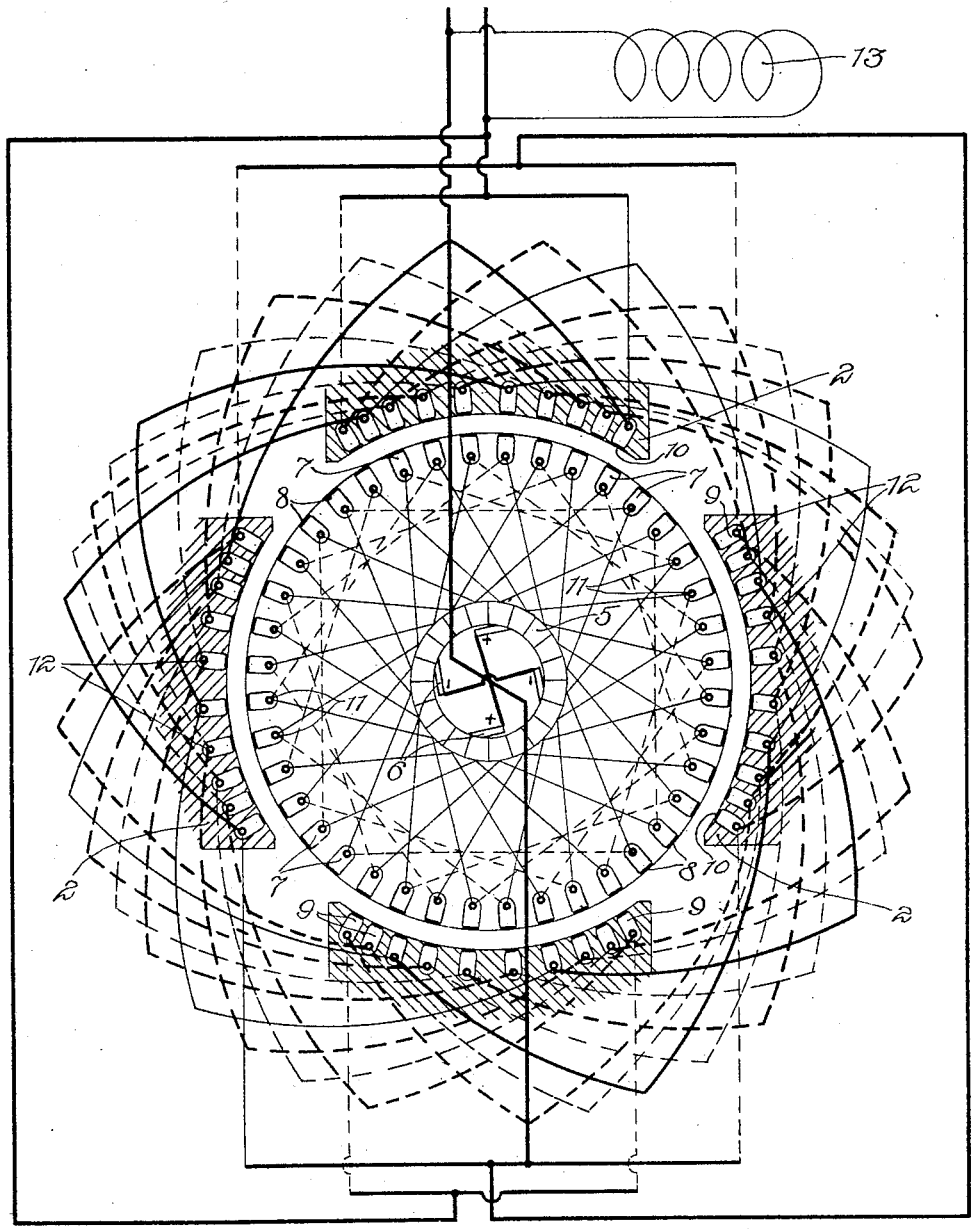

Figure 1 is a diagrammatic illustration of the armature and compensation coil windings and connections; Fig. 2 is an end elevation of a dynamo machine equipped with my improved compensation coils; Fig. 3 is similar to Fig. 1 showing, however, a different arrangement of slots in the pole faces; Fig. 4 is a perspective view of a single compensation coil as wound upon a former; Fig. 5 is a side elevation of one of the pole pieces showing its lamination; and Fig. 6 illustrates a modification adapted for purposes of over or under-compensation.

In accordance with my invention I provide the usual field frame 1, within which are mounted the preferably laminated pole pieces 2. The direction of lamination is indicated in Fig. 5, which shows one of the pole pieces in side elevation. The plane of the laminations in the pole pieces is the same as that in the armature. The slots to be formed in the laminæ may be cut in the punchings before they are assembled, as is the common practice with respect to armature punchings. The rotatable armature core 3 is supported by bearings 4 and provided with a commutator 5. Brushes 6, 6, are adapted to conduct current to and from the commutator.

For the purposes of illustration I have shown the compensation coils arranged to compensate the armature reactions for a four-path armature which carries forty conductors, and which is arranged to operate in a four-pole field. The armature coils are laid in slots 7, 7, of the armature core, and are held in place by the wedges 8, 8, preferably made of wood or other insulating material. In a similar manner the coils of the compensation windings are laid in slots 9, 9, cut in the pole faces, where they are held in place by wedges 10, 10. It will be seen that the total number of slots cut in the pole faces is equal to the total number of slots cut in the armature core, there being ten slots cut in each pole face.

In Fig. 1 the slots in the pole faces are shown as being evenly distributed over the pole faces. The spacings of the slots may, however, be varied to meet the requirements of particular cases. In Fig. 3 I have diagrammatically illustrated a pole face in which the slots are made closer together near the pole tips than at the center of the pole face.

The armature conductors 11 and the compensation conductors 12 may each be considered to represent either a single conductor or the cross-section of a coil. The back end connections of the armature conductors or coils are represented by the light dotted lines, while the front end connections are represented by the full lines. In the representation of the end connections for the compensation winding, the front connections are represented by the heavy lines, and the back connections by the light lines.

For the purposes of illustration, I have shown in the drawings, a four-path armature winding, and have also shown the compensation coils divided into four parallel paths to correspond to the paths through the armature. It is not essential, however, that the compensation winding shall have the same number of parallel paths as the armature winding, or that the connections shall be the same, provided that when exact compensation is required the number of paths and conductors, or, in other words, the ampere turns of the compensation winding, be equal to the number of ampere turns upon the armature.

In case it is desired to over-compensate or to under-compensate the armature turns, the number of compensating conductors may be made different from the number required to cause the compensating ampere turns to equal the armature ampere turns; or the desired result may be accomplished by the interposition of resistance in the compensation winding circuit, so that the current in the compensation winding may be made different from that in the armature winding. Fig. 6 illustrates this modification of my invention. The reference characters are applied as in Fig. 1 and with the same meaning. It will be noted, however, that for each conductor passing through an armature slot (assuming each of the little circles to represent a single conductor) there are two conductors passing through corresponding slots in the pole face. If, therefore, all the current passing in parallel through four paths in the armature is passed in parallel through four paths through the compensating coils, by connecting with the positive and negative terminals at 51, 52, 53 and 54 the effective ampere turns of the compensation winding will be twice the number of ampere turns of the armature winding, and the machine will be over-compensated. By following both of the paths for current from each of the positive terminals to both of the negative terminals, it will be found that the plus and minus signs applied to the various conductors, are in accordance with the direction in which the current flows in the respective conductors, the plus sign representing current flowing away from the observer and the negative sign representing current flowing toward the observer. By following the current through the armature conductors from the positive to the negative brushes it will be found that the currents in both of the compensation conductors in a given slot flow in the opposite direction from the current in the single conductor in the adjacent armature slot. I have indicated a variable resistance at 55 which is connected in shunt of the terminals of the compensation winding. By varying the amount of this shunt resistance the proportion of the total current which passes through the compensation winding can be regulated so as to secure more or less ampere turns, as may be desired.

In the drawings I have diagrammatically illustrated shunt field windings by the shunt coil 13, but it is to be understood, of course, that other arrangements of the field windings are equally applicable.

In Fig. 4 I have shown a coil 14 having terminals 15 and 16 which is adapted to be laid in the slots cut in the pole faces to accommodate the compensation winding.

It will be apparent that when the slots are spaced over one surface in a manner similar to that in which the slots are spaced over all the other pole faces, then the distance between a given slot in one pole face through which one side of a coil passes, and the slot in another pole face through which the other side of the same coil passes, is always the same. The coils which pass through the slots and form the compensation conductors, may therefore all be similarly formed. Therefore, it is apparent that the coils may be wound upon a common former, and may then be placed in position.

It will be apparent that my invention may be applied equally well to motors or generators, and in this specification and these claims the term "dynamo" is used to mean either a generator or a motor, as is clearly understood in ordinary electrical parlance. It is also to be understood that my invention may be used with either direct current or alternating current dynamos.

While I have shown and particularly described one embodiment of my invention, it is evident that many modifications and changes may be advantageously made without departing from the spirit thereof, and I do not, therefore, wish to limit myself to the precise disclosure herein set forth, but Having described my invention, I claim as new and desire to secure by Letters Patent:

1. In a dynamo, the combination with a field magnet having salient pole pieces, of an armature, unequally spaced slots formed in and distributed unequally and entirely across said pole pieces, and a compensation winding laid in said slots, substantially as described.

2. In a dynamo, the combination with a field magnet having salient pole pieces, of an armature core, slots formed in said armature core, an armature winding laid in said slots, slots formed in said pole pieces, said slots being equal in number to the slots in said armature core, and a winding laid in said slots in the pole pieces, substantially as described.

3. In a dynamo, the combination with a field magnet having pole pieces, of an armature, slots formed in said pole pieces, and a compensation winding composed of similar previously formed coils laid wholly in said slots, substantially as described.

4. In a dynamo, the combination with a field magnet having salient pole pieces, of an armature core, slots formed in said armature core, an armature winding laid in said slots, unequally spaced slots formed in said pole pieces, said slots being equal in number to the slots in said armature, and a compensation winding laid in said slots in the pole pieces, substantially as described.

5. In a dynamo, the combination with a field magnet having pole pieces, of an armature, slots formed in said pole pieces, said slots being spaced farther apart toward the center of the pole faces than near the pole tips, and a compensation winding composed of previously formed coils laid in said slots, substantially as described.

6. In a dynamo, the combination with a field magnet having salient pole pieces, of an armature core, slots formed in said armature core, an armature winding laid in said slots, slots formed in said pole pieces, said slots being spaced farther apart toward the center of the pole pieces than near the pole tips, and a compensation winding laid in said slots in the pole pieces, substantially as described.

7. In a dynamo, the combination with a field magnet having laminated salient pole pieces, the pole faces having slots formed therein, and a set of similar form wound coils each passing through slots in the pole faces.

8. In a dynamo, the combination with a field magnet having pole pieces, of an armature core, slots formed in said armature core, an armature winding laid in said slots, slots formed in the pole faces, and a compensation winding laid wholly in said last mentioned slots, said compensation winding being composed of similar previously formed coils, substantially as described.

9. In a dynamo, the combination with a field magnet having salient pole pieces, of an armature core, slots formed in said armature core, an armature winding laid in said slots, slots formed in the pole faces, said slots being equal in number to the slots in said armature, and a compensation winding laid in said slots in the pole faces, said compensation winding being composed of previously formed coils, substantially as described.

10. In a dynamo, the combination with a field magnet having salient pole pieces, of an armature core, slots formed in said armature core, an armature winding laid in said slots, slots formed in the pole faces, said slots being equal in number to the slots in said armature, and a compensation winding laid in said slots in the pole faces.

11. In a dynamo, the combination with an armature core, of an armature winding thereon, a field magnet having laminated salient pole pieces, there being a plurality of slots formed in each pole face, said slots being spaced farther apart toward the center of the pole faces than near the pole tips, a compensation winding composed of similar form wound coils laid in said slots, and a variable resistance connected in shunt of the compensation winding.

12. In a dynamo, the combination with a magnet having pole pieces, of an armature having an armature winding, slots formed in the pole faces, said slots being more closely spaced near the pole tips than toward the centers of the pole faces, and a compensation winding laid in said slots, the circuit connections for said compensation winding being such that the ampere turns of the compensation winding shall at all times equal the ampere turns of the armature winding.

13. In a dynamo, the combination with a field magnet having salient pole pieces, of an armature having an armature winding, slots formed in the pole faces, said slots being more closely spaced near the pole tips than toward the centers of the pole faces, and a compensation winding laid in said slots, said winding having the same number of ampere turns as said armature winding, substantially as described.

14. In a dynamo, the combination with a field magnet having salient pole pieces, of an armature having an armature winding, slots formed in the pole faces, said slots being more closely spaced near the pole tips than toward the centers of the pole faces, and a compensation winding laid in said slots, said compensation winding being composed of previously formed coils, substantially as described.

15. In a dynamo, the combination with a field magnet having pole pieces, of an armature, and a compensation winding of similar previously formed coils distributed wholly in said pole pieces about the armature, said compensation winding having the same number of ampere turns as the armature winding.

16. In a dynamo, the combination with a field magnet having pole pieces, slots formed in the pole faces, and a compensation winding of identical form wound coils laid wholly in the slots in said pole faces.

17. In a dynamo, the combination with a field magnet having salient pole pieces of which the pole faces are suitably slotted, a main field magnet winding, and a set of similar form wound coils laid wholly in slots in the pole faces.

18. In a dynamo, the combination with a field magnet having pole pieces, there being a plurality of slots formed in each pole face, of a compensation winding composed of similar coils laid wholly in said slots, and means for varying the effective ampere turns of the compensation winding.

19. In a dynamo, the combination with an armature core, of an armature winding thereon, a field magnet having salient pole pieces, there being a plurality of slots formed in each pole face, said slots being placed farther apart toward the center of the pole faces than near the pole tips, and a winding composed of similar form wound coils laid wholly in said slots.

In witness whereof, I hereunto subscribe my name this fourth day of May A. D., 1904.

DUGALD C. JACKSON.

Witnesses:
WM. B. JACKSON,
DORA E. CASEY.